(12) United States Patent
Chiang

(10) Patent No.: US 6,652,103 B2
(45) Date of Patent: Nov. 25, 2003

(54) REFLECTIVE-TYPE LIQUID CRYSTAL PROJECTION SYSTEM

(75) Inventor: Yai-Hui Chiang, Taipei (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 0 days.

(21) Appl. No.: 10/006,230

(22) Filed: Dec. 10, 2001

(65) Prior Publication Data

US 2003/0107710 A1 Jun. 12, 2003

(51) Int. Cl.[7] .............................................. G03B 21/14
(52) U.S. Cl. ............................ 353/31; 353/83; 353/34
(58) Field of Search ............................ 353/20, 31, 33, 353/34, 37, 38, 84; 349/5, 8, 9

(56) References Cited

U.S. PATENT DOCUMENTS

| | | | | |
|---|---|---|---|---|
| 5,863,125 A | * | 1/1999 | Doany | ........................ 348/743 |
| 6,247,816 B1 | * | 6/2001 | Cipolla et al. | ................. 353/20 |
| 6,273,567 B1 | * | 8/2001 | Conner et al. | .................. 349/9 |
| 6,327,093 B1 | * | 12/2001 | Nakanishi et al. | .............. 349/9 |
| 6,343,864 B1 | * | 2/2002 | Tajiri | .............................. 349/9 |
| 6,375,330 B1 | * | 4/2002 | Mihalakis | ..................... 353/31 |
| 6,384,972 B1 | * | 5/2002 | Chuang | ........................ 348/756 |
| 6,390,626 B2 | * | 5/2002 | Knox | .............................. 349/9 |
| 6,419,362 B1 | * | 7/2002 | Ikeda et al. | ................... 353/20 |

* cited by examiner

Primary Examiner—William Dowling
(74) Attorney, Agent, or Firm—Bacon & Thomas, PLLC

(57) ABSTRACT

A reflective-type liquid crystal projection system consists of a dichroic prism that diffracts the light beam generated by a light source module into two colored light beams of different wavelengths; and three polarizing light flux splitter prisms that are symmetrically disposed around the said dichroic prism as well as two related converging lens groups enabling three RGB color images shown on three reflective-type liquid crystal display panels to be merged into a single image and then projected onto a television screen for viewing.

8 Claims, 6 Drawing Sheets

US 6,652,103 B2

REFLECTIVE-TYPE LIQUID CRYSTAL PROJECTION SYSTEM

BACKGROUND OF THE INVENTION

1) Field of the Invention

The invention herein relates to a reflective-type liquid crystal projection system.

2) Description of the Prior Art

According to the principles utilized during optical diffraction and focusing, the conventional liquid crystal projection television systems can be generally classified as transparent (TFT) or reflection (LCD) types. Since the transparent-type liquid crystal projection television systems were developed earlier, the components utilized in the said systems are more mature. However, with respect to the liquid crystal panels, since the resolution and clarity of reflective-type liquid crystal display panels is superior and, furthermore, lower in price, more and more liquid crystal projection television manufacturers plan to use reflective-type liquid crystal display panels designs.

Referring to FIG. 1, a conventional transparent-type TFT liquid crystal projection television system consists of a projection bulb 10. The light generated by the said projection bulb 10 is passing through a filter lens group 11 and then sequentially passing through a reflection mirror 130, a lens group 14, and a dichroic mirror 150 after being filtered, such that the said light is diffracted into two beams of different wavelengths. After the one beam of light is sequentially passing a reflection mirror 133 and a convergent lens 160, it is projected onto a red transparent-type liquid crystal display (R-TFT) panel 170. The other beam of light is directed towards another dichroic mirror 151 and further diffracted into two beams of light. The said two beams of light are then passing through reflection mirrors 131 and 132 as well as the convergent lens 161, 163, and 164, and are projected onto a green transparent-type liquid crystal display (G-TFT) panel 171 and a blue transparent-type liquid crystal display (B-TFT) panel 172 respectively. After diffraction, the said three beams of light travel through the red transparent-type liquid crystal display (R-TFT) panel 170, the green transparent-type liquid crystal display (G-TFT) panel 171, and the blue transparent-type liquid crystal display (B-TFT) panel 172, and let the red, green and blue images shown thereon be projected to a polarizing beam splitter (PRS) prism 18. The said polarizing beam splitter prism 18 merged these images into a single image, which is then penetrating a projection lens 190 and is projected onto a television screen 191 for viewing. Therefore, in a transparent-type TFT liquid crystal display projection television system, two dichroic mirrors 150 and 151 are utilized to diffract the light generated by the projection bulb 10 into three light beams of different wavelengths, such that the image of the said light beams reaching the red transparent-type liquid crystal display (R-TFT) panel 170, the green transparent-type liquid crystal display (G-TFT) panel 171, and the blue transparent-type liquid crystal display (B-TFT) 172 are projected to a polarizing beam splitter prism 18 and merged into a single image by the said polarizing beam splitter prism 18.

Referring to FIG. 2, a conventional reflective-type LCD projection television system also consists of a projection bulb 20. The light generated by the said projection bulb 20 is passing through a filter lens group 21 and then passing through a dichroic mirror 220 after being filtered, where the said light is diffracted into two light beams of different wavelengths. One beam thereof sequentially passes through a reflection mirror 230 and a convergent lens 240, and is projected to a first polarizing beam splitter prism 250. After passing the said prism 250, the beam of light is reflected to a red reflective-type liquid crystal display (R-LCD) panel 260. The other beam of light passes through the reflection mirrors 231 and 232 as well as another dichroic mirror 221 respectively, and is further diffracted into two beams of light. The said two beams of light then respectively pass through the convergent lens 241 and 242 and projected to a second and a third polarizing beam splitter prism 251 and 252. The said two prisms 251 and 252 respectively reflect them to a green reflective-type liquid crystal display (G-LCD) panel 261 and a blue reflective-type liquid crystal display (B-LCD) panel 262. After the said diffracted beams of light are projected onto the reflective-type liquid crystal display panels 260, 261 and 262, the red, green and blue images shown thereon are respectively reflected to a fourth polarizing beam splitter prism 27 through the said prisms 250, 251, and 252. The said fourth polarizing beam splitter prism 27 merges these images into a single image, which is then penetrating a projection lens 28 and is projected onto a television screen for viewing.

As described above, although the said reflective-type liquid crystal display panel has superior resolution and clarity and, furthermore, the advantage of lower price, since the overall system utilizes a larger quantity of optical components and, furthermore, the optical structure is more complex, its physical dimensions are larger and thus its overall production cost is higher.

SUMMARY OF THE INVENTION

In view of the foregoing situation, to improve upon the shortcomings of the said conventional reflective-type liquid crystal projection system, the inventor of the invention herein conducted extensive research and testing that culminated in the successful design of the reflective-type liquid crystal projection system of the invention. The said system consists of a dichroic mirror that diffracts the light beam generated by a light source module into two colored light beams of different wavelengths; and three polarizing light flux splitter prisms that are symmetrically disposed around the dichroic prism as well as two related converging lens groups, such that the three RGB color images shown on three reflective-type liquid crystal display panels are merged into a single image and then projected onto a television screen for viewing. As a result, the structural design of the present invention is simpler and, furthermore, the overall physical dimensions are smaller than the conventional reflective-type liquid crystal projection television system, thereby effectively reducing production, storage, and shipping costs.

DETAILED DESCRIPTION OF THE INVENTION

Figure 1:
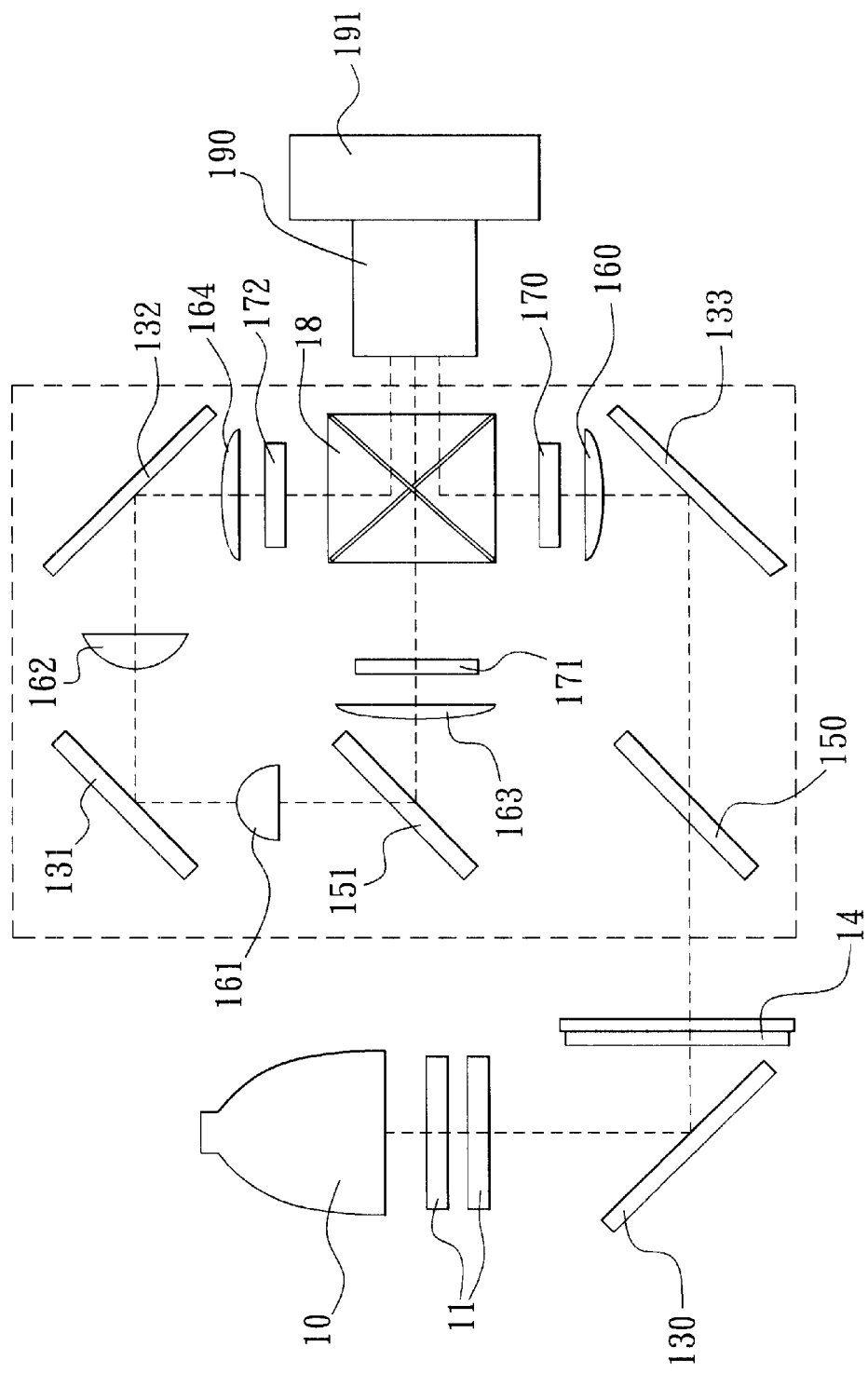
FIG. 1 is a drawing of a conventional transparent-type liquid crystal projection television system.
Figure 2:
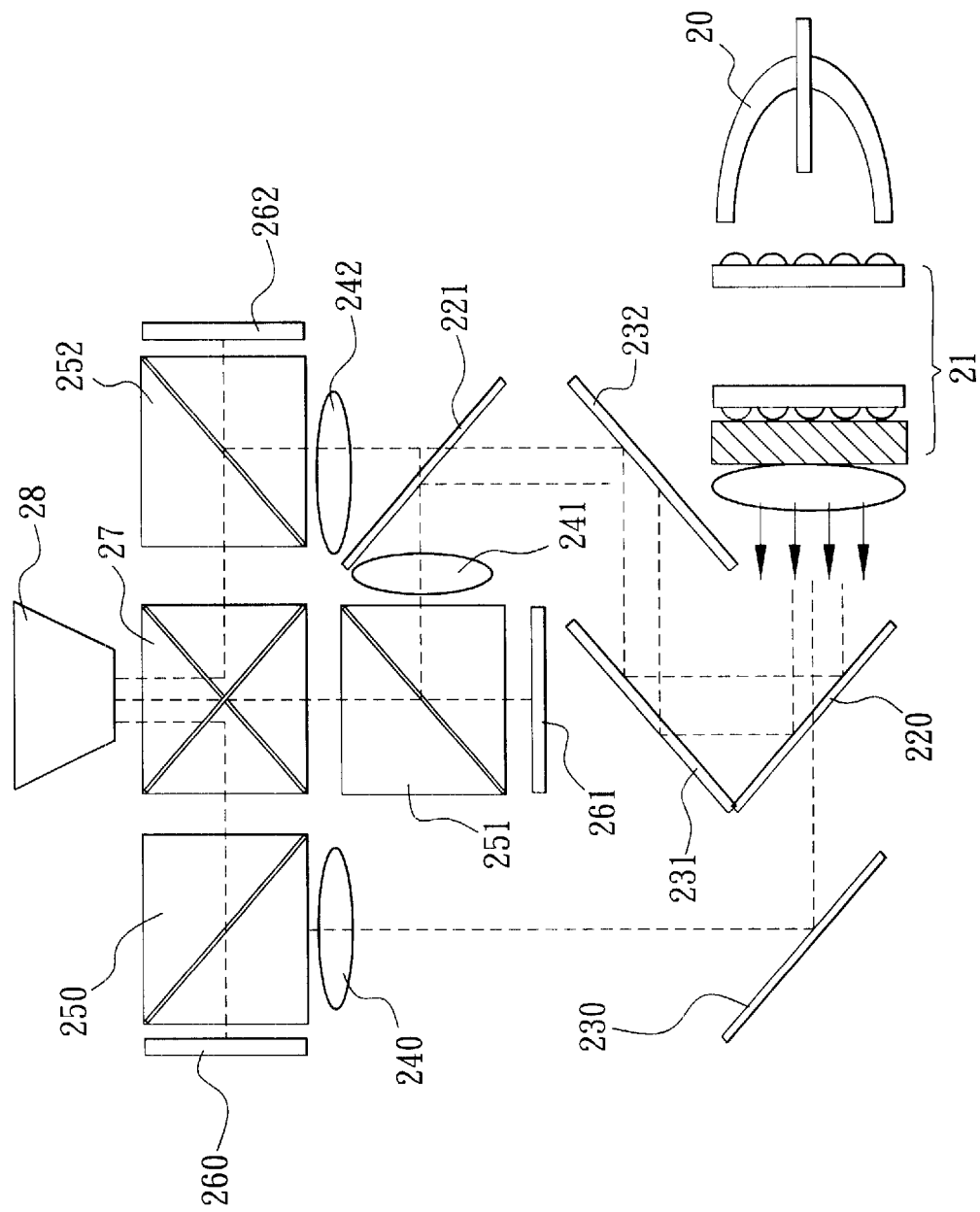
FIG. 2 is a drawing of a conventional reflective-type liquid crystal projection television system.
Figure 3:
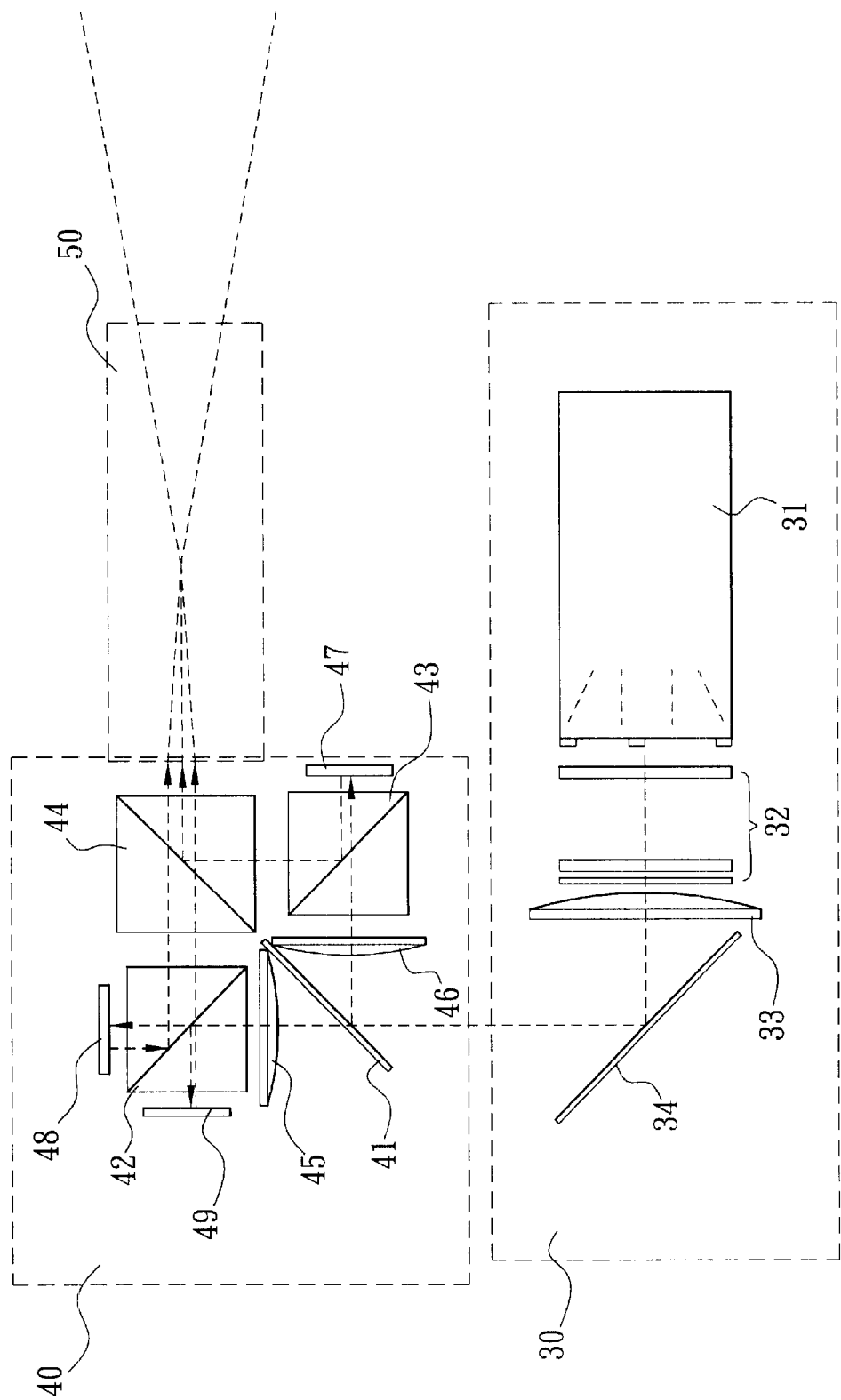
FIG. 3 is a drawing of the reflective-type liquid crystal projection system of the invention herein.

The invention herein is a reflective-type liquid crystal projection system. Referring to FIG. 3, the said system is comprised of a light source module 30, an optical diffraction and focusing module 40, and a lens module 50. The said light source module 30 consists of a projection light bulb 31, a filter lens group 32, a convergent lens 33, and a reflection mirror 34, enabling the beam of light generated by the said projection light bulb 31 to first pass through the said filter lens group 32 for correctly reshaping and filtering its optical field. After the light beam penetrates the said convergent lens 33 and is focused onto the said reflection mirror 34, it is redirected 90 degrees by the said reflection mirror 34 and projected to the said optical diffraction and focusing module 40.

The said optical diffraction and focusing module 40 consists of a dichroic prism 41, at least three polarizing light flux splitter prisms 42, 43, and 44, at least two converging lens groups 45 and 46, and a red reflective-type liquid crystal display (R-LCD) panel 47, a green reflective-type liquid crystal display (G-LCD) panel 48, and a blue reflective-type (B-LCD) panel 49 for showing red, green, and blue (RGB) images thereon. After the light beam projected from the said light source module 30 is received by the said dichroic mirror 41, the said light beam is refracted into colored lights of two different wavelengths. The first beam of colored light passes through the first converging lens group 45 and is projected to the first polarizing light flux splitter prism 42. After penetrating the said prism 42, the said first beam of colored light is further refracted into colored light of two different wavelengths, and the said two beams of colored light are projected to the adjacent vertically arrayed first and second reflective-type liquid crystal display panels 48 and 49. The second beam of colored light passes through the second converging lens group 46 and is projected to the second polarizing light flux splitter prism 43. After penetrating the said prism 43, the said second beam of colored light is projected to the proximal third reflective-type liquid crystal display panel 47. After the projection of the said beams of colored light to the said reflective-type liquid crystal display panels 47, 48, and 49, the red, green and blue color images shown thereon are respectively reflected back to the facing prisms 42 and 43, and projected to the third polarizing light flux splitter prism 44. The third polarizing light flux splitter prism 44 merges these images into a single image and, furthermore, dispersed them onto the said lens module 50, thereby enabling the image to be projected by the said lens module 50 onto a television screen for viewing.

Figure 4:
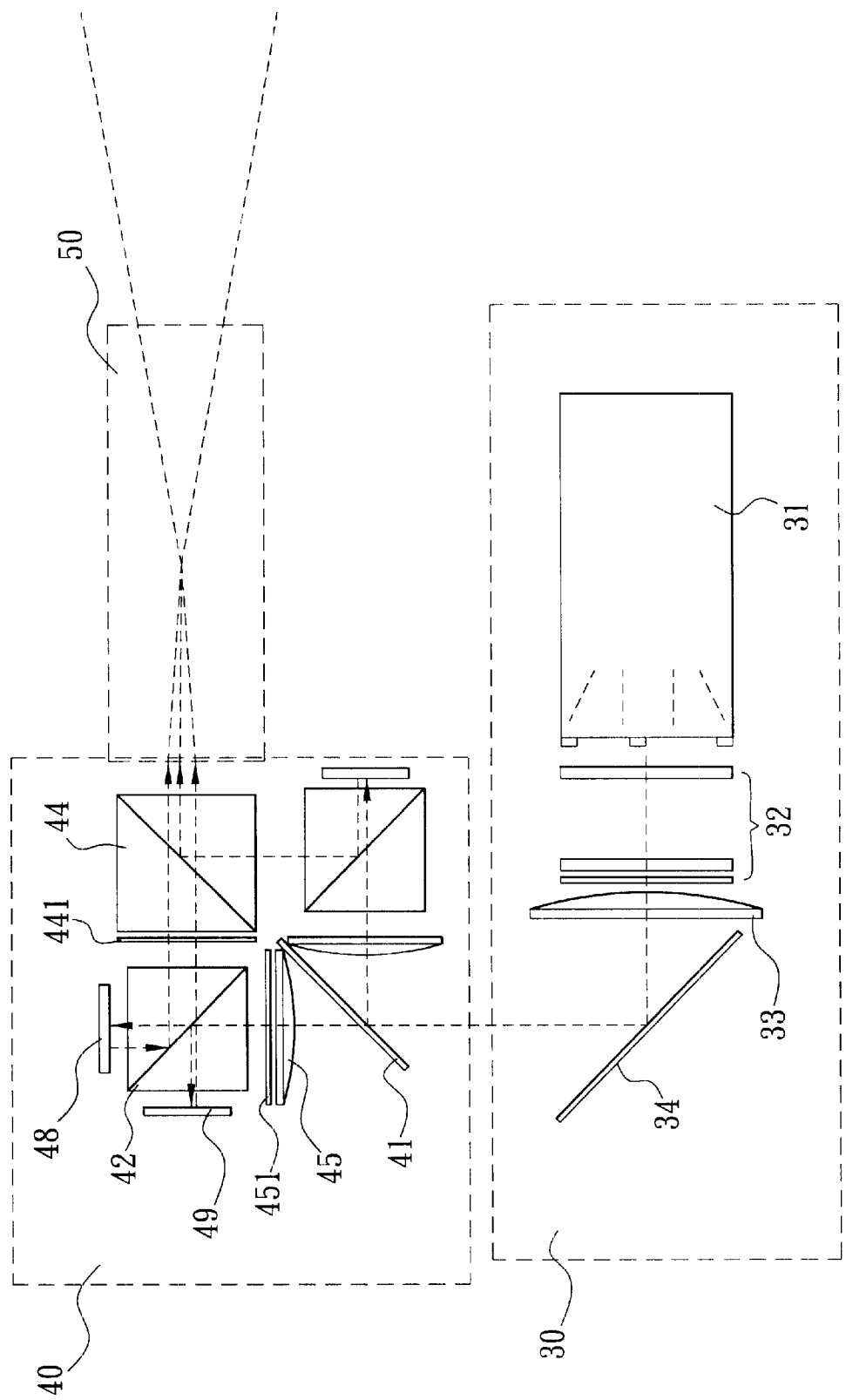
FIG. 4 is a drawing of one preferred embodiment of the reflective-type liquid crystal projection system of the invention herein.

In one preferred embodiment of the invention herein, referring to FIG. 4, after the output of the said light source is refracted by the said dichroic prism 41 into colored lights of two different wavelengths, the said first beam of colored light is focused by the first converging lens group 45 and then differentiated into vertical P-polarized light and horizontal S-polarized light by the color selector filtering lens 451 installed thereon. Such that, after the P-polarized light and the S-polarized light are projected to the first polarizing light flux splitter prism 42, the said S-polarized light is redirected 90 degrees. And then, the said S-polarized light and P-polarized light are respectively projected onto the adjacent vertical arrayed first and second reflective-type liquid crystal display panels 48 and 49. The color images reflected onto the said first and second reflective-type liquid crystal display panels 48 and 49 are then reflected back to the said prism 42 respectively, whereupon the said prism 42 redirects the P-polarized light by 90 degrees. As a result, the said P-polarized light and S-polarized light are projected together onto a color selector lens 441 and, after undergoing the color selection process of the color selector lens 441, the said two beams of colored lights are both converted into a P-polarization and projected to the third polarizing light flux splitter prism 44. The said prism 44 merges the images into a single image and projects it through the said lens module 50 onto a television screen for viewing.

Figure 5:
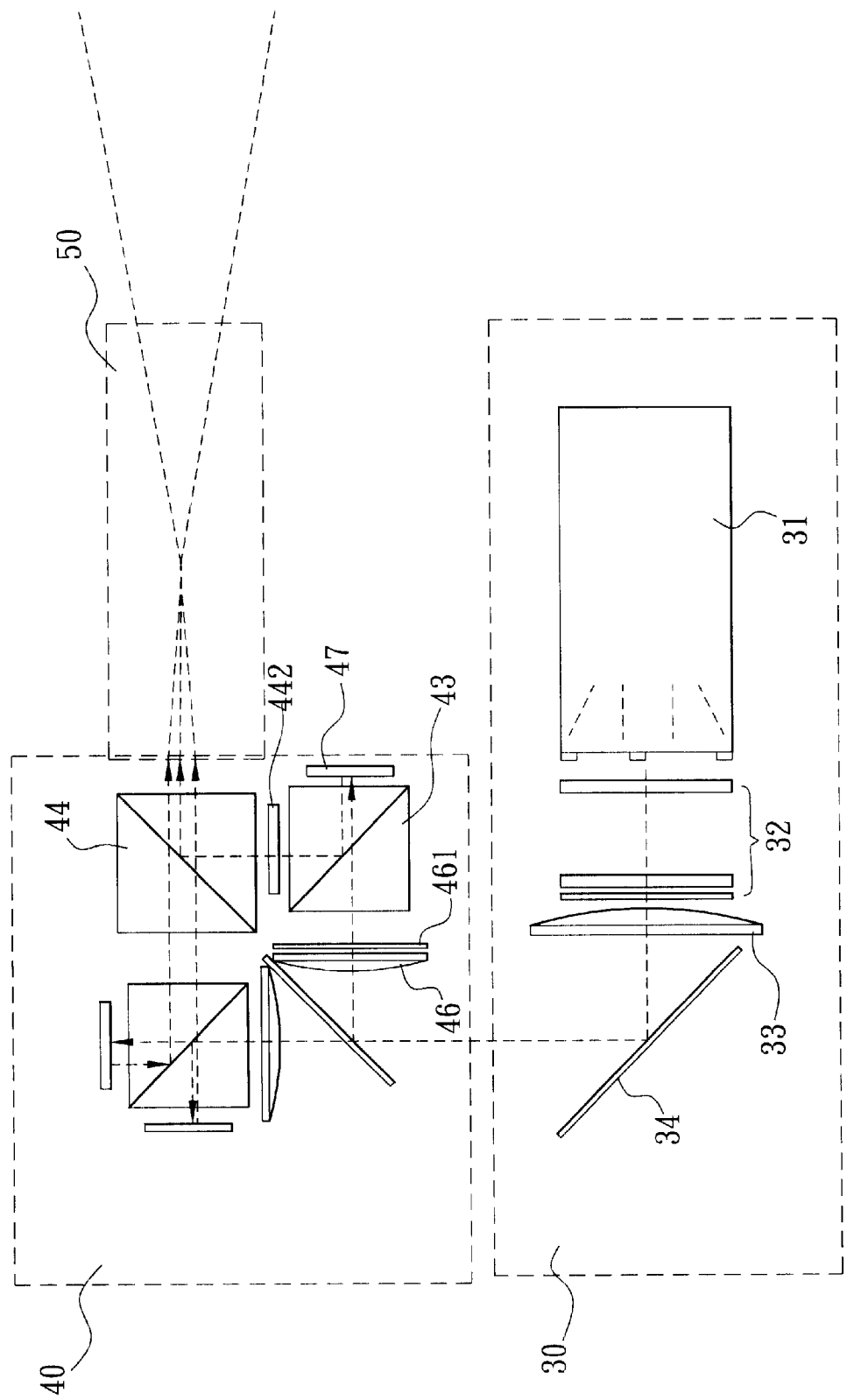
FIG. 5 is a drawing of another preferred embodiment of the reflective-type liquid crystal projection system of the invention herein.

In another preferred embodiment of the invention herein, referring to FIG. 5, after the output of the said light source is refracted by the said dichroic mirror 41 into colored lights of two different wavelengths, the said second beam of colored light is focused by the second converging lens group 46 and then undergoes a polarization process by a polarizer or a polarizer and retarder 461 installed thereon. After that, the said second beam of colored light is converted into vertical P-polarized light and projected to the said second polarizing light flux splitter prism 43. Passing through the said prism 43, the said second beam of colored light is projected onto the proximal third reflective-type liquid crystal display panel 47. The color image (such as blue) reflected onto the said third reflective-type liquid crystal display panel 47 is then reflected back to the said prism 43, whereupon the said prism 43 converts the said second beam of colored light into horizontal S-polarized light, and then redirects it by 90 degrees. After that, it passes through another polarizer or a polarizer and retarder 442 and is projected to the said third polarizing light flux splitter prism 44, where the polarization characteristics of the said the said prism 44 redirects the said beam of colored light by 90 degrees. Finally, it is conveyed through the said lens module 50 and projected onto a television screen for viewing.

Figure 6:
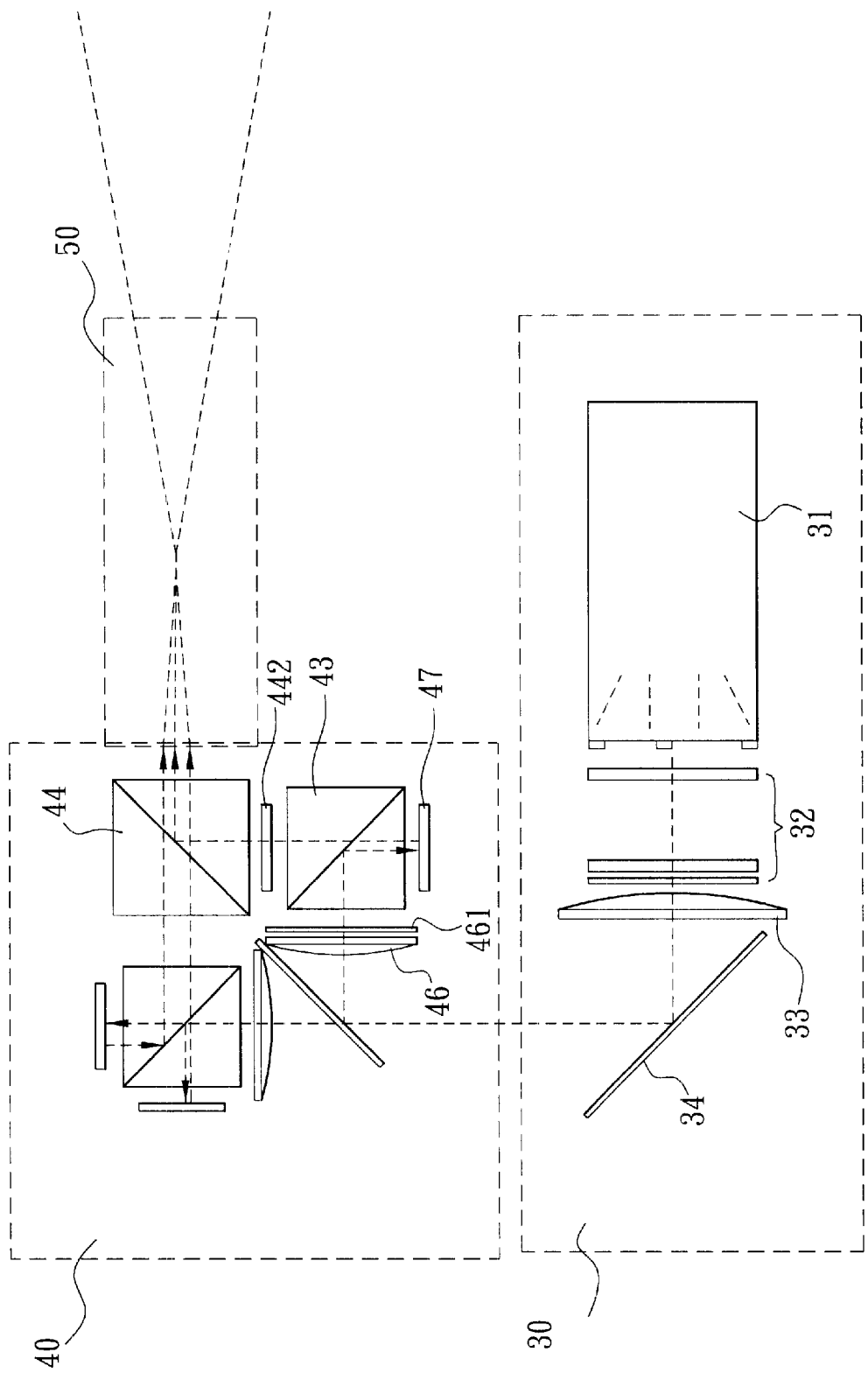
FIG. 6 is a drawing of yet another preferred embodiment of the reflective-type liquid crystal projection system of the invention herein.

In still another preferred embodiment of the invention herein, referring to FIG. 6, after the output of the said light source is refracted by the said dichroic mirror 41 into colored lights of two different wavelengths, the said second beam of colored light is focused by the second converging lens group 46 and then undergoes a polarization process by a polarizer or a polarizer and retarder 461 installed thereon. After that, the said second beam of colored light is converted into horizontal S-polarized light and projected to the said second polarizing light flux splitter prism 43. After passing through the said prism 43, the polarization characteristics of the said the said prism 43 redirects the said beam of colored light by 90 degrees, and projects it onto the proximal third reflective-type liquid crystal display panel 47. The color image (such as blue) shown on the proximal third reflective-type liquid crystal display panel 47 is then reflected back to the said prism 43, whereupon the polarization process of the said prism 43 converts the said second beam of colored light into vertical P-polarized light. After that, the said vertical P-polarized light passes through another polarizer or a polarizer and retarder 442, where the said beam of colored light is converted into horizontal S-polarized light and is projected to the said third polarizing light flux splitter prism 44. The polarization characteristics of the said the said prism 44 redirects the said beam of colored light by 90 degrees. Finally, it is conveyed through the said lens module 50 and projected onto a television screen for viewing.

As such, the said third polarizing light flux splitter prism 44 merges the three RGB color images respectively shown on the reflective-type liquid crystal display panels 47, 48, and 49 into a single image, and projects it through the said lens module 50 onto a television screen for viewing. Since the said structure of the invention herein requires only one dichroic mirror 41 for refracting the light beam generated by the said light source module 30 into colored lights of two different wavelengths. Three polarizing light flux splitter prisms 42, 43, and 44 symmetrically disposed around the said dichroic prism 41, as well as two related converging lens groups 45 and 46, are utilized to merge three RGB color images shown on the reflective-type liquid crystal display panels 47, 48, and 49 into a single image and then project it on a television screen for viewing. The structural design of the present invention is simpler and, furthermore, the overall physical dimensions are smaller than the conventional reflective-type liquid crystal projection television system, thereby effectively reducing production, storage, and shipping costs.

While the invention has been described by means of specific embodiments, numerous modifications and variations could be made thereto by those skilled in the art without departing from the scope and spirit of the invention set forth in the claims.

What is claimed is:

1. A reflective-type liquid crystal projection system with a single dichroic mirror, comprising:

a light source generating a beam of light;

a mirror for reflecting said beam of light from said light source;

a dichroic mirror for receiving said beam of light from said mirror and splitting said beam into two beams of colored light, wherein a first beam of colored light is reflected and a second beam of colored light is transmitted;

a first polarizing light flux splitter prism for receiving said first beam of colored light;

a color selector filtering lens between said dichroic mirror and said first polarizing light flux splitter prism;

a first reflective-type liquid crystal display panel for receiving said first beam of colored light from said first polarizing light flux splitter prism to form a first image and reflect said first image back to said first polarizing light flux splitter prism;

a second polarizing light flux splitter prism for receiving said second beam of colored light and for splitting the second beam into a third beam of colored light and a fourth beam of colored light;

a second reflective-type liquid crystal display panel for receiving said third beam of colored light from said second polarizing light flux splitter prism to form a second image and reflect said second image back to said second polarizing light flux splitter prism;

a third reflective-type liquid crystal display panel for receiving said fourth beam of colored light from said second polarizing light flux splitter prism to form a third image and reflect the third image back to said second polarizing light flux splitter prism;

a third polarizing light flux splitter prism for receiving said first image, said second image, and said third image to merge a single image from said first polarizing light flux splitter prism and said second polarizing light flux splitter prism; and a lens module receiving said single image for viewing.

2. The reflective-type liquid crystal projection system according to claim 1, wherein said mirror redirects said beam of light from said light source by 90 degrees.

3. The reflective-type liquid crystal projection system according to claim 2, further comprising a filter lens group between said light source and said mirror.

4. The reflective-type liquid crystal projection system according to claim 3, further comprising a first convergent lens between said filter lens group and said dichroic mirror.

5. The reflective-type liquid crystal projection system according to claim 4, further comprising a color selector filtering lens between said dichroic mirror and said first polarizing light flux splitter prism.

6. The reflective-type liquid crystal projection system according to claim 1, further comprising a first retarder between said first polarizing light flux splitter prism and said third polarizing light flux splitter prism, and a second retarder between said first polarizing light flux splitter prism and said dichroic mirror.

7. The reflective-type liquid crystal projection system according to claim 4, further comprising a color selector filtering lens between said dichroic mirror and said second polarizing light flux splitter prism.

8. The reflective-type liquid crystal projection system according to claim 4, further comprising a color selector lens between said second polarizing light flux splitter prism and said third polarizing light flux splitter prism.

* * * * *